July 29, 1958 M. F. NATHAN 2,844,886
TREATMENT OF CARBONACEOUS SOLIDS
Filed Sept. 5, 1956

INVENTOR.
MARVIN F. NATHAN
BY
J. H. Palmer
V. J. Davies
ATTORNEYS

United States Patent Office 2,844,886
Patented July 29, 1958

2,844,886
TREATMENT OF CARBONACEOUS SOLIDS

Marvin F. Nathan, New York, N. Y., assignor to The M. W. Kellogg Company, Jersey City, N. J., a corporation of Delaware Application September 5, 1956, Serial No. 608,147

8 Claims. (Cl. 34—10)

This invention relates to method and means for treating solid materials and more particularly to method and apparatus for the fluidized treatment of carbonaceous materials such as coal, shale, lignite, oil sands, etc., at low temperatures. Still more particularly, the invention relates to method and means for drying and heating fluidized carbonaceous materials.

This application is a continuation-in-part of my co-pending application Serial No. 517,472, filed June 23, 1955, now U. S. Patent No. 2,775,551, dated December 25, 1956.

The treatment of carbonaceous solids to form valuable liquid, gaseous and solid products is well known in the art. An example of one process frequently employed entails the treatment of solids, such as coal, at elevated temperatures whereby volatile materials are released from the solids and a valuable solid residue is formed. This process is usually called carbonization. In another process, which comprises an extension of the carbonization process, the non-distillable portion of the carbonaceous solids is also converted to gas. This process is customarily referred to as gasification. It has been the practice in the past to carry out carbonization and gasification in both nonfluid and fluid systems; however, the present invention is concerned with processes of the fluid type wherein the various steps are performed with a finely divided feed material which is maintained in a highly turbulent state of agitation by the passage therethrough of a fluidizing medium.

In carrying out fluidized treatment of carbonaceous materials, it has been found that certain preliminary process steps are necessary in order to provide a workable operation and assure a maximum yield of desirable vapor, liquid and solid products. More usually, the first step in the treatment of carbonaceous materials concerns the proper preparation of the raw feed material. This involves not only proper selection and sizing of the carbonaceous solids to provide a readily fluidizable feed, but also includes drying the solids to a predetermined moisture content prior to further processing. In carrying out the drying step it is usually preferred to heat the carbonaceous feed only to the minimum temperature necessary to remove the surface water, which is, of course, the boiling point of water at the pressure conditions maintained during this operation. The subsequent carbonization or gasification treatment, however, is usually carried out at an elevated temperature, substantially above the temperature at which the solids leave the drying step. It is necessary to supply heat to the solids following the drying operation to preheat them to the required treating temperature.

It is an object of this invention to provide an improved method and means for drying and preheating carbonaceous solids.

Another object of this invention is to provide improved method and apparatus useful in the preparation of carbonaceous solids for treatment at elevated temperatures.

Another object of this invention is to provide an improved method and means for the carbonization and gasification of carbonaceous solids.

These and other objects of the invention will become more apparent from the following detailed description and discussion.

In accordance with this invention, the aforementioned objects are achieved by providing contiguous, openly communicating drying and preheating zones and means for passing solids from the preheating zone to the drying zone in sufficient quantity to supply the heat required to dry the wet feed solids. The heat required for preheating is provided by indirectly heating solids removed from the drying zone and introducing said solids to the preheating zone.

In another aspect of the invention, part of the solids withdrawn from the drying zone are returned thereto after heating and the remainder of the dry heated solids are combined with solids from the preheating zone, heated to a higher temperature and introduced to the preheating zone. In this aspect of the invention solids may or may not be introduced to the drying zone from the preheating zone.

It is within the scope of this invention to treat various subdivided solid materials in the maner described, including for example catalytic materials and solids normally used for contacting purposes, such as sand, pumice, carborundum, clays, etc.; also carbonaceous materials such as coals, shales, lignites, asphalts, oil sands, etc. This invention is particularly exemplified by its application to the treatment of the latter materials and specifically to the carbonization of coal. The following discussion is directed to this type of operation; however, it is not intended that the particular application presented should limit the scope of the invention in any way.

The first step in the carbonization of coal is concerned with surface water present in the coal feed which may, unless removed, prevent fluidization of the coal. One of the problems encountered when handling carbonaceous materials such as coal in a fluidized system results from the tendency of the finely divided solids to agglomerate because of water condensed thereon. Most coals coming from a treating plant, for example, have a relatively high surface of "free" water content, usually between about 2 and about 15 percent by weight, or higher. Unless removed, this moisture causes the finely divided coal particles to stick together and resist fluidization. Even after fluidization is achieved, moisture may cause packing or bridging in process equipment of restricted cross section, such as, for example in feed hoppers, standpipes, etc. It is not always economically feasible to remove all the moisture from the coal; however, it has been found that agglomeration and packing of coal particles due to the presence of water is minimized if between about 50 percent and about 90 percent of the water initially present is removed.

It has been suggested in the past to dry carbonaceous solids with air and other gases at high temperatures. This method, although workable, suffers from several deficiencies. Because of the low heat capacity of most gases, sufficient heat for drying is not provided by this method unless the drying gas is present in large quantities and at elevated temperature. The use of a large amount of gas is expensive because of compression requirements, and it complicates the recovery of solids from the drying medium. The use of elevated temperatures is also undesirable since high temperature may cause a substantial part of the volatile material in the coal to vaporize and mix with the drying medium and thus further complicate the recovery problem. Furthermore, high gas temperatures may bring the coal to the plastic state and cause agglomeration of the coal particles thereby resulting in an inoperable condition.

Other methods of drying coal have also been suggested; however, all of the processes presently in use suffer from serious deficiencies of one type or another. In the drying process disclosed herein, drying problems are reduced to a minimum by using a two zone drying and preheating system and supplying the heat required through indirect heat exchange. In carrying out the drying operation, raw coal suitably subdivided for fluidization, that is, of a size between about 10 and about 400 mesh is introduced into a first zone wherein it is commingled with dry heated coal in sufficient quantity to elevate the entire mass of coal to a temperature suitable to effect the removal of water. The dry coal is then passed through a heater where it is further elevated in temperature by indirect heat exchange with a hot fluid and then into a second zone. The higher temperature coal in the second zone serves as the source of the coal commingled with the wet coal feed, and in addition, provides preheated coal for the next phase of the carbonization process. The entire drying and preheating step is conducted in a fluidized system with both the low and high temperature zones containing a dense phase bed of fluidized coal. Adequate turbulence to maintain each dense phase bed is provided by maintaining a linear gas velocity therein between about 0.5 and about 5 feet per second, or more usually between about 0.75 and about 3 feet per second. Under normal operating conditions the density of the beds thus provided varies between about 10 and about 40 pounds per cubic foot. The temperatures in the two zones may vary, depending on the residence time of the coal in each zone and the moisture content of the raw coal feed. However, usually the first zone is operated at a temperature between about 220° F. and about 325° F., and the second zone is preferably maintained at a temperature of between about 350° F. and about 600° F. Depending also on the moisture content of the coal, the rate of feed introduction to the drying zone is adjusted to allow an average particle residence time therein of between about 5 and about 45 minutes. Fluidization of the solids in the low temperature zone is partially provided by moisture released from the coal and may be augmented by the introduction of air or an inert gas such as, for example flue gas, steam, etc. The coal in the high temperature or preheating zone is maintained in a fluid state by the introduction of a similar gasifying medium. It is necessary to circulate a sufficient amount of coal from the low temperature zone through the heater to the high temperature zone and back to the low temperature zone to provide both the sensible heat acquired by the dry solids and the heat of vaporization of the water released. When operating in accordance with the zonal temperature ranges given, the amount of coal circulated relative to the raw coal feed rate is between about 2 and about 5 pounds per pound.

The heat transfer surface required for drying and preheating the coal is preferably provided by a conventional shell and tube heat exchanger with the solids being passed through the tubes in indirect heat exchange with a hot fluid passed through the exchanger shell. The heat required to dry the coal is provided by a fluid heating medium which may be a petroleum oil or vapor, or mixtures thereof, or other liquid or vapor material which is easily transported and can withstand relatively high temperatures. In general, liquid heating fluids are more satisfactory than gases because of their high specific heats and low volume relative to gases. Examples of suitable heating fluids are residual petroleum oils, synthetic heat transfer liquids, inorganic salt mixtures, lead, mercury, etc. The temperature at which the heating medium is employed varies with the temperature maintained in the drying zone and with the heat transfer characteristics of the heating medium. Usually, it is preferred to introduce the heating medium at a temperature between about 350° F. and about 1000° F. Temperatures greater than this are not desirable because of the danger of overheating coal particles in contact with the heat transfer surface.

The amount of heat exchange surface required to carry out the drying and preheating operations varies depending on several factors including the quantity of coal to be heated, the amount of moisture in the coal, heat transfer coefficients, etc. More usually a surface area between about 0.02 and about 0.30 square foot per pound of fresh coal feed per hour is sufficient to provide the desired drying and preheat.

Operation of the drying portion of the carbonization process in the manner previously described provides a dry, easily fluidizable solid material which may be subjected to further processing without danger of agglomeration or equipment plugging. This method of operation is carried out without the disadvantages of previous drying methods and results in only slightly more than the minimum dust recovery problem. Operation in the manner described also has positive advantages in that the drying step is carried out with a high degree of thermal efficiency and requires a minimum amount of heat exchange equipment. It has been found in the operation of conventional indirect heat exchangers wherein heat is transferred to a mixture of entrained solids and gases that the rate of heat transfer is sensitive to the concentration of solids in the fluid stream, with streams of high solids concentrations giving substantially higher heat transfer coefficients than gaseous mixtures containing only a few solids. It is important, therefore, when transferring heat in this manner to prevent dilution of the gas solids stream with additional gases, for example water vapor. By operating the drying step in the aforedescribed manner, substantially all of the moisture removed from the coal is separated therefrom in the first low temperature zone. This assures a minimum amount of vaporization of water from the coal in its passage through the exchanger and therefore a minimum dilution of the stream. The net result is a process having a constant high heat transfer rate.

Another reason and advantage in carrying out the drying process as described relates to the velocity of the solid-gas stream flowing through the heat exchanger. When using a tubular solids heater it is necessary to pass the fluidized solids therethrough at a rather high velocity, usually between about 10 and about 30 feet per second in order to overcome the pressure drop in the exchanger tubes and maintain the solids in a fluidized state. This is particularly true in an up-flow type of heater wherein the solids tend to settle in a direction opposite to the flow of the fluidizing medium. If solids containing water are passed through the exchanger, the water is converted to steam, this increases the velocity of the gas-solids stream and may create a serious erosion problem.

The proposed method of operation provides still a further advantage by virtue of the removal of water from the coal prior to the heating step. Passage of coal through the heater requires the use of standpipes and transfer lines which of necessity employ sharp bends and turns. In addition, conventional exchangers, more usually of the tube and shell type, also present flow paths of restricted cross section. An attempt to pass a wet coal through such a system may lead to agglomeration of the coal particles and plugging, the very results which are sought to be prevented by the drying step. This operative hazard, as well as those previously mentioned, of course, is avoided by the drying method described herein.

After leaving the preheating zone, the coal is passed to a pretreating zone where it is contacted with air or other oxygen containing gas and partially burned. The purpose of this operation is to "case harden" the coal particles and thereby nullify their agglomerating tendency as they pass through the plastic state. The temperature at which this process step is carried out may vary over a range between about 600° F. and about 825° F.; however, more usually it is preferred to pretreat the coal in a more narrow range of temperature, that is, between about 650° F. and about 800° F. As in the previous operations, the coal pretreatment is preferably carried out in a conventional dense phase fluidized bed, wherein the coal is maintained in a turbulent fluid state by passage therethrough of a gasiform medium. Adequate turbulence to maintain the dense phase bed is provided by maintaining a linear gas velocity therein between about 0.5 and about 5 feet per second. Under normal operating conditions, the density of the dense phase bed thus provided varies between about 10 and about 40 pounds per cubic foot. Generally, a portion or all of the fluidizing medium is supplied in conjunction with the oxygen required for pretreating. This may be accomplished by diluting the oxygen with air, by using air alone or by diluting air or oxygen with steam or other inert gas. The amount of oxygen required for pretreating is usually between about 0.02 and about 0.08 pound per pound of dry coal feed. To provide sufficient time for the pretreating combustion reactions to take place, the rate of introduction of coal to the pretreating zone is adjusted to allow an average particle residence time therein of between about 10 and about 60 minutes.

Upon entering the pretreating zone, dry preheated coal at a relatively low temperature becomes intimately mixed with higher temperature pretreated coal and is swiftly elevated to the temperature level prevailing in this zone. As the temperature of the dry coal is increased, a portion of the lower boiling tar components present in the coal are vaporized and passed into the fluidization and combustion gases. Since oxygen is relatively non-selective in its action, this phase of the carbonization process may involve the consumption of a portion of the tar. For this reason, it is desirable to limit the introduction of oxygen to the preheating zone to the minimum amount necessary to prevent agglomeration of the solids and maintain an operable system.

Following pretreating, the coal is passed into a carbonization zone wherein the major portion of the volatile components are removed and a valuable residue char is formed. This, the major step of the process, is also conveniently carried out in a dense phase fluidized bed similar to the drying, preheating and pretreating beds previously described. In order to effect removal of the volatile coal components, a large amount of heat must be introduced to the carbonization zone. Conventionally, this heat may be supplied from one or more of several sources, for example it may be provided in an inert gas such as a flue gas heated to a high temperature, or it may be supplied from a combustible gas such as fuel gas mixed with oxygen or it may be furnished from the combustion of oxygen or an oxygen containing gas with a portion of the carbonaceous feed. When heat is provided by burning either fuel gas or coal, the gasiform fluidizing medium required to maintain the dense phase in the carbonization zone is generally furnished by the combustion gases. If necessary, however, deficiencies in the quantity of fluidizing medium may be made up by the introduction into the carbonization zone of a flue gas, steam or other extraneous inert gas.

The carbonization of coal to remove distillable tars therefrom and produce a char residue product is conducted over a wide range of temperatures usually between about 700° F. and about 2400° F. The preferred thermal range of operation is determined to a great extent by the type of liquid product desired; for example, when it is preferred to distill the coal tars with a minimum of cracking of volatile constituents, namely low temperature carbonization, the temperature is held to a minimum of about 700° F. and not more than about 1000° F. The type of coal is also of importance in establishing the operating temperature since some coals are more difficult to distill than others. The carbonization zone contains a dense phase bed superposed by a disperse or dilute phase which may have a solids concentration as low as 0.001 pound per cubic foot. Gases from the dense phase zone pass into the dilute phase which provides a preliminary rough separation of vapors and solids. Further solids separation is provided by conventional means, such as, for example cyclones, filters, etc.

Substantially all of the desirable constituents of coal are removed at the aforementioned carbonization temperatures within a very short period of time, that is between about 0.25 and about 10 minutes. As a further precaution to prevent agglomeration of the coal particles in the carbonizing zone, it is preferred to maintain a substantial ratio of char to fresh feed therein. This serves to dilute the fresh pretreated coal, which provides the desired beneficial effect; however, it also makes it necessary to substantially increase the coal residence time. At the usual char to fresh feed ratios maintained in the carbonization zone, that is between about 5 pounds per pound and about 50 pounds per pound, the particle residence time therein is between about 2 minutes and about 200 minutes, more usually between about 20 minutes and about 100 minutes.

Drying, preheating, pretreating and carbonization may be carried out over a wide range of pressures; however, the pressure is usually maintained between atmospheric and 500 p. s. i. g., preferably between about atmospheric and about 100 p. s. i. g. Depending on the methods used for transferring solids from zone to zone it may be desirable to provide a pressure differential between zones.

As previously mentioned, this invention is not limited in its scope to the treatment of coal, but encompasses the use of other carbonaceous feed materials, for example shales, asphalt, oil sands, etc. Similar processing considerations are important and similar operations are required when carbonizing these feed materials other than coal. The conditions appropriate for each specific feed material are well known to those skilled in the art and for this reason do not need repeating here.

Hot char product from which the major portion of the volatile constituents of the coal have been removed is withdrawn from the lower portion of the carbonizer and is passed through a cooler wherein the temperature of the char is lowered by indirect heat exchange with a fluid cooling medium. When operating in accordance with the ranges of process variables previously enumerated, the amount of this material varies between about 0.6 and about 0.9 pound per pound of wet feed coal. The remainder of the raw material delivered to the process is now in a vapor state, comprising a mixture of steam, combustion gases and tar vapors. The apparatus used in conjunction with the char cooling preferably comprises one or more conventional tubular heat exchangers similar to those previously described in conjunction with drying and preheating the coal feed. The type and quantity of cooling fluid passed through the exchanger may be varied to meet the particular needs of the process. In general, fluids similar to those previously disclosed for use in drying and preheating the coal are used. This operation is simplified and the cost is substantially reduced, if a common fluid medium is used for both coal drying and preheating, and for cooling the product char. When operating with this type of system, a continuous circulating fluid stream is provided, which extracts heat from the hot char product and transfers it to the fresh coal feed. Inasmuch as the heat removed from the char in the cooling operation may not be sufficient to provide the heat required for drying and preheating the coal feed, or vice versa, it is desirable when using a common heat exchange fluid to provide an additional heat source, such as for example a conventional tubular heater, or an additional source of cooling, such as for example a water cooler, whichever is required.

In this preliminary cooling step, the char temperature is usually reduced to between about 700° F. and about 400° F., although it may be brought to a still lower temperature if desired. The cooling fluid may be introduced to the cooler at any low temperature; however, when a common circulating stream is used the inlet temperature, of necessity, conforms to the temperature of the fluid leaving the heaters which serve the drying and preheating stages of the carbonization process, i. e. between about 650° F. and about 350° F. The size of the cooler required varies with the amount and temperature of the char product, the heat transfer coefficients of the flowing streams and other operating variables; however, more usually a surface area between about 0.01 and about 0.10 square foot per pound of char product per hour is adequate to provide the desired cooling.

Normally, only a portion of the heat contained in the product char can be removed economically by indirect cooling, particularly when using a common circulating heat exchange fluid. To further cool the char and provide a more easily handled product, water is injected into the partially cooled fluidized char which is then passed into a receiver or char hopper. The quantity of water used for this purpose may vary; however, usually it is preferred to limit it to not more than the amount necessary to cool the char to the dew point of water at the pressure existing in the receiver, thus converting the entire quantity of cooling water to steam. By operating in this manner, advantage is taken of the high vaporization heat of water to provide maximum cooling with a minimum of water consumption and at the same time provide additional vapors to maintain the char in the hopper in a fluidized state. The cooled product is then conveniently removed from the hopper, defluidized by contact with additional water which condenses the fluidizing steam and is passed from the system by means of a conveyor or other suitable means.

As previously mentioned, the effluent vapors from the carbonizer comprise gaseous products of combustion and various tar compounds plus a small amount of entrained char. The major portion of the tar materials in the gases condense to liquids at ordinary temperatures and form a valuable product of the carbonization process. To effect the separation of the normally liquid tar, the carbonizer gas stream is passed to a quench tower where the vapors are contacted with a low temperature liquid tar. This material not only provides the cooling effect necessary to condense liquid tars but also effects the removal of entrained solids from the gases. The scrubbing and condensing liquid is preferably obtained by circulating tar condensed in the quench tower through a cooler and recycling it to the upper portion of the tower. Within the tower are provided suitable baffles or plates whereby intimate contact between ascending gases and downflowing liquid is effected. The pressure at which this operation is carried out is controlled by the pressure in the carbonization zone, being somewhat lower, usually between about 10 and about 2 p. s. i. g. It has been found that the major portion of the desirable liquid tar compounds are condensed by cooling the carbonizer gases to between about 150° F. and about 80° F. The remaining vaporous tar compounds and combustion products form a gas, which although low in heat content, may be used as a fuel. If desired, of course, a further separation between the uncondensed tar compounds and combustion and fluidization gases may be effected.

In order to more clearly describe the invention and provide a better understanding thereof, reference is had to the following drawings of which:

Figure 1:
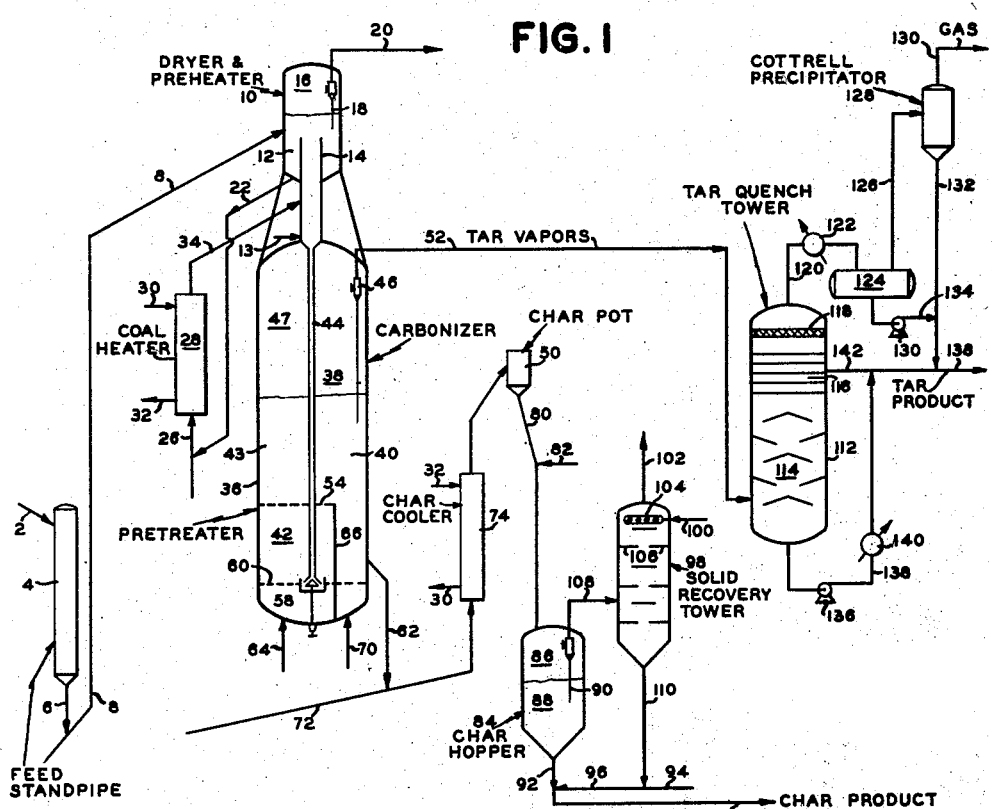
Figure 1 is a diagrammatic illustration in cross section of process equipment used in carrying out a preferred embodiment of the invention comprising a unitary coal carbonization system which includes a dryer, preheater, pretreater, carbonizer, char hopper, solids recovery system, tar quench tower and associated lines and heat exchange equipment.

Referring now to Figure 1 a finely subdivided coal at a temperature of about 60° F. having a particle size distribution between about 10 mesh and about 10 microns is delivered through conduit 2 into feed standpipe 4 wherein it is maintained in a dense turbulent state by passage therethrough of a fluidizing medium. The coal entering the system contains about 8% of surface water by weight. From standpipe 4 the fluidized coal passes downwardly through conduit 6 where it is entrained in additional gases, in this instance steam, and passed upwardly through conduit 8 to a drier and preheater vessel 10 which is at a substantially higher elevation. Within the drier vessel there is maintained a dense highly turbulent bed 12 of dry coal particles at a temperature of about 270° F. The upper portion of this bed occupies the entire cross section of the drier vessel 10; however, in the lower portion thereof the dry coal is confined within an annular space lying between the walls of the drier and a cylindrical elongated conduit extending upwardly through the bottom of the drier. Within this conduit lies a preheating zone 14 in which there is maintained a higher temperature dense bed of coal particles which overflow continuously into the lower temperature dry solids bed 12. Above the dense beds of dry and preheated coal is a dilute phase 16 of low solids concentration. Water vapors released from the coal pass upwardly through this space into a cyclone 18 from which separated solids are returned to the dense phase of dry coal, and from which the vapors leave the drier through conduit 20.

To provide the sensible heat required to heat the wet coal and the latent heat of vaporization of the water present therein, a stream of dry coal is removed from the annular drying zone 12 through conduit 22, entrained in fluidizing steam and passed upwardly through conduit 26 and coal heater 28 wherein the temperature of the coal is increased to about 480° F. From the heater the hot coal is passed into conduit 14 from which it eventually overflows to the drying zone. In order to maintain the desired temperature in the drying zone, it is necessary to overflow about 2 pounds of solids from conduit 14 per pound of wet coal introduced into the unit. Thus the solids circulation rate through the coal heater 28 is about 3 pounds of coal per pound of wet feed. The heat required in the combined drying and preheating operation is supplied by passing the circulating solids stream in indirect heat exchange with a cat cracker decanted oil having an API gravity of about 15. This material is introduced to heater 28 through conduit 30 at a temperature of about 680° F. and exits therefrom through conduit 32 at a temperature of about 400° F. The foregoing method of drying the coal is simple in application and in addition to effecting removal of moisture from the coal, it provides a ready means of adding to the coal the amount of preheat required before pretreating the coal, the next step in the process.

Although the hot coal leaving heater 28 enters zone 14 in a fluidized condition, it may be desirable to introduce additional gases, such as for example steam through conduit 13. Generally, the water vaporized in the drying zone is adequate to provide the desired turbulence in the dry solids bed; however, if necessary, an additional quantity of fluidizing gases may also be introduced to zone 12. The amount of fluidizing gases passed through each zone is controlled to provide a velocity therein of about 2 feet per second, thereby maintaining a solids density in each bed of about 25 pounds per cubic foot. As previously mentioned, the effluent gases from both zones pass through a conventional cyclone 18 for the separation of entrained solids which are returned to zone 12. The gases then leave the system through conduit 20.

The combined drying and preheating vessel 10 forms a part of a unitary vessel structure being superposed above a carbonization vessel 36 which contains within its lower portion a pretreating zone 42. Passage of solids from the preheating zone 14 to the pretreating zone 42 is effected by flowing them downwardly through a standpipe 44 enclosed within the carbonizer vessel. Inasmuch as the standpipe passes through the carbonizer before it reaches the pretreating zone, it is exposed to the high temperatures in the former zone and it may be desirable to provide some form of insulation to protect this conduit. The rate of flow of solids from the preheating zone 14 to the pretreating zone 42 is controlled to maintain a more or less constant level in vessel 10 by a conventional plug valve 58 in contact with the bottom terminus of the standpipe 44. The pretreating zone 42 is separated in part from the carbonization zone 40 by a vertical baffle 66 attached at the bottom and sides to the inner wall of the carbonizer vessel 36. The bottom portion of the treating zone contains a distribution grid 60 for distributing fluidizing gases throughout the pretreated coal. The pretreating zone opens upwardly into the carbonizing zone 40 and is separated therefrom by a grid 54 through which pretreated solids and vapors pass from the former to the latter zone.

The pretreating operation involves contacting the coal particles with a controlled amount of oxygen, viz., about 0.04 pound per pound of preheated coal, whereby the coal particles are partially oxidized. In this manner, the physical characteristics of the particles are altered so as to nullify their tendency to adhere to each other as they are elevated in temperature and pass through the so-called "plastic" stage. The effectiveness of the pretreating step is dependent not only on the extent to which the coal particles are oxidized, but is also a function of the pretreatment temperature, which is substantially increased over the preheating temperature, that is to about 725° F. The heat required to elevate the coal to this temperature is in normal operation supplied entirely from the heat of combustion of the coal. In carrying out the pretreating step, oxygen is introduced through conduit 64 and is distributed in the lower portion of the pretreating zone through grid 60. The oxygen may be supplied in a relatively pure state; however, more usually, it is preferred to use air, not only from the viewpoint of cost, but also to supply the additional gases necessary to maintain the solids in the pretreating zone in a fluidized state. Although the air admitted to the system normally suffices for this purpose, additional gases such as, for example, steam, flue gas, etc. may be introduced through conduit 64 for fluidization purposes.

Coal entering the pretreating zone commingles with the solids contained therein and is partially oxidized and rapidly increased in temperature to that of the dense phase bed. In this process about 4 percent by weight of the preheated coal is reacted with the oxygen and converted to combustion products. The resulting mixture of pretreated coal and combustion gases, along with any portion of unconsumed oxygen, passes upwardly through the pretreating zone and through grid 54 into the carbonization zone 43. Within this zone there is maintained a dense phase turbulent bed of solid char particles at a substantially higher temperature, that is about 950° F. Inasmuch as the pretreating zone is entirely beneath the top level of the solids in the carbonization zone, the grid 54 serves the dual purpose of distributing the solids and gases leaving the pretreating zone and at the same time prevents passage of solids from the carbonization zone to the pretreating zone.

The preheated coal from zone 14 contains a large number of organic tar compounds varying widely in molecular structure and boiling point. The increase in temperature in this zone releases a portion of the lower boiling of these volatile compounds which pass upwardly into the carbonization zone 43 along with the pretreated solids and other gases. Upon entering the latter zone, the pretreated solids are quickly elevated to the temperature prevailing therein and large additional amounts of volatile components are released from the coal. The total time required in the two zones to carry out the process of tar removal is of short duration; however, in order to prevent solids from agglomerating and thereby assure an operable fluid process, it is desirable to maintain a large excess of pretreated solids in the pretreating zone and a similar excess of carbonized solids or char in the carbonization zone. This is effectively provided by sizing the pretreating and carbonization zones to allow an average particle residence therein of about 25 minutes and about 60 minutes, respectively. The pretreated solids bed is maintained in a highly turbulent state by controlling the flow of vapors therethrough to provide a gas velocity of about 1.2 feet per second and a solids density of about 25 pounds per cubic foot. Usually, this is effected by varying the oxygen rate through conduit 64; however, if necessary, an extraneous gas (not shown) is admitted to zone 42. The degree of turbulence and density of the solids in zone 43 is regulated in a similar manner.

The heat required for carbonizing the coal feed is also supplied by burning a portion of this material. For this purpose, about 0.03 pound of oxygen per pound of pretreated coal feed is introduced into the carbonization zone 43. In this operation also the oxygen is introduced in the form of air rather than in a pure state, for the reasons previously given. Since one of the important features in optimizing liquid product yield is minimum contact between oxygen and volatile tar constituents, the oxygen required for carbonization is introduced into the bottom of the carbonization zone through conduit 70 which is at a point remote from the area of introduction of pretreated coal into the same zone. Oxidation and combustion of the carbonized coal particles proceeds rapidly and is substantially completed before the carbonizer fluidizing and combustion gases reach the elevation at which the pretreated coal is present in quantity. The heat released by the combustion reactions is quickly transmitted throughout the dense char bed providing a hot turbulent mass into which lower temperature pretreated solids are introduced. The transfer of heat from the char particles to the pretreated solids in turn is equally swift and these solids reach the general char bed temperature level within a very short period of time. The process of devolatilization also proceeds at a fast rate and, by the time the pretreated solids reach the zone of combustion, they are substantially free of volatile tars.

By reason of the location of withdrawal counduit 62, char product from the main upper portion of the carbonization solids bed is forced to flow downwardly through the space provided between baffle 66 and the wall of the carbonizer vessel 36. Hot combustion and fluidizing gases flow upwardly through the same space countercurrent to the descending char and provide a stripping action which assists in the removal of tar compounds from the char. The removal of volatile components from the coal in the carbonization zone, therefore, is effected in two ways, i. e., by elevating the pretreated coal particles to the carbonization temperature and by passing these particles downwardly countercurrent to ascending combustion and fluidizing gases before withdrawing them from the carbonization zone. Without a doubt, increased temperature is the major factor in effecting tar removal; however, the stripping action of the combustion gases contributes to the total tar yield by removing some residual volatile materials.

The final products of the carbonization process comprise a mixture of tar vapors, steam and combustion gases, and carbonaceous char solids. Distribution of these products, based on the wet coal feed, is approximately 8 percent steam, 14 percent tar compounds and 76 percent char. The remainder of the coal is converted to combustion products to supply the process heat requirements. The gaseous products pass from the dense phase bed of char 43 upwardly into a dilute phase 47 and from there through a cyclone separator 46 and conduit 52. Solids recovered in the cyclone are returned to the dense char bed below the surface thereof. Char solids product are removed from the bottom of the carbonizer 36 through conduit 62, are picked up by a stream of fluidizing steam and are passed through conduit 72 upwardly through a char cooler 74 for preliminary cooling. The fluidized char solids enter the cooler at a temperature substantially the same as that maintained in the carbonization zone, i. e., about 925° F., and exit from the cooler at a temperature of about 500° F. To extract the heat from the char, a cat cracker decanted oil of about 15 API gravity is introduced into the cooler through conduit 32 at a temperature of about 400° F. This material flows through the cooler countercurrent to the char and exits therefrom through conduit 30, being heated in its passage through the cooler to about 600° F. To provide a process of maximum thermal efficiency, a continuous circulating fluid system (not shown) is used in which a common hydrocarbon fluid accomplishes both char cooling and the drying and preheating of the coal feed. Substantially more heat is required in the drying and preheating operation than is obtained by cooling the char. Therefore, in order to thermally balance the system, it is necessary to supply an additional amount of heat to the oil prior to its introduction into the coal heater 28. This may be done in any conventional manner, such as, for example, by passing the decanted oil through a conventional fired heater (not shown) or other conventional heating means.

The lower temperature char leaving cooler 74 is passed into a char pot 50 from which it flows downwardly through conduit 80 into a char hopper 84 where it accumulates in a conventional dense phase fluidized bed 88, superposed by a dilute phase 86. Although a substantial amount of heat is removed from the char in the cooler, this material is still much too hot to be yielded as product. It is preferable, for convenience in handling the char, that it be cooled to a much lower temperature and, if possible, by a more efficient method than indirect heat exchange. The large amount of additional cooling required is conveniently and economically furnished by introducing water into the char through conduit 82 prior to passage of the char into the char hopper 84. The water is immediately converted to steam, thus providing, in addition to the cooling effect, additional fluidizing medium suitable for maintaining the solids in conduit 80 in a turbulent state. The amount of water combined with the char is controlled to provide a temperature in the char hopper at or slightly above the dew point of water at the pressure existing therein. In this specific illustration, the hopper pressure is about 3.5 p. s. i. g. and the temperature of the dense char bed 88 is about 230° F. These conditions are maintained by cooling the char with about 0.07 pound of 80° F. water per pound of char. Operating in this manner prevents liquid water from passing into the hopper, and the solids contained therein are readily maintained in a fluid state.

Steam which results from the char cooling disengages from the solids in bed 88, passes upwardly through dilute phase 86 and a conventional cyclone separator 90 for the removal of entrained solids, and thence through conduit 108 into a secondary solids recovery tower 98. Within the solids recovery tower 98 which contains a number of baffles 106, the char solids are scrubbed with water introduced through conduit 100, and spray ring 104. The resulting solids-water slurry is withdrawn from the bottom of the recovery tower through conduit 110, is diluted with additional water from conduit 94 and then combined with char removed from the bottom of the char hopper through conduit 92. The slurry water serves to condense any steam remaining in the char released from the hopper, thereby defluidizing this material. The total char product is then removed from the unit by a conveyor or by other suitable means (not shown).

The temperature in the solids recovery tower is about 216° F., which, at the pressure existing therein, that is about 2 p. s. i. g., is equal to the dew point of water. It is preferred in carrying out the solids recovery process that a minimum amount of the steam introduced to tower 98 be condensed. In order to assure this result, the temperature of the scrubbing water is maintained at substantially the same level as the temperature within the tower. This is conveniently accomplished by heating the water prior of its introduction to the recovery tower, or more preferably by recycling hot slurry from conduit 110 to the top of the recovery tower (not shown). Even when using recycle slurry for scrubbing, however, it is necessary to introduce extraneous warm make-up water through conduit 100 to compensate for water in the slurry combined with the char product. The scrubbed gases, consisting of essentially solids-free steam, accumulate in the upper portion of tower 98 and are removed therefrom through conduit 102. This gas, although low in pressure and temperature, contains a large amount of latent heat and may be used in any conventional service where low pressure steam is of value.

Tar vapors formed in the pretreating and carbonization zones, together with the gaseous products of combustion, pass from the carbonizer 36 through conduit 52 and are introduced into a tar quench tower 112. A substantial portion of the tar in these gases consists of compounds which are liquid under normal atmospheric conditions. These compounds are readily condensed in the quench tower by contacting the hot gases with a quantity of cool liquid tar. The liquid tar also serves as a scrubbing medium and operates to remove char solids entrained in the hot gases. In carrying out this step, the vapors are introduced into the bottom of the tar quench tower and pass upwardly around baffles 114 countercurrent to liquid tar introduced into the tower through conduit 142. The cooler vapors subsequently pass through a number of perforated trays 116, through a mist extractor 118 to remove entrained liquid droplets and exit from the quench tower through conduit 120. The liquids and solids removed from the vapors by the scrubbing tar are transferred from the bottom of the quench tower through pump 136 and are passed through conduit 138 and cooler 140. A portion of the cooled material is returned to the quench tower through conduit 142 and the remainder is yielded as product through conduit 138. The temperature of the gases leaving the top of the quench tower is about 160° F. This is still substantially above atmospheric temperature and in order to lower the temperature of the gases still further they are passed through a water cooler 122, where additional tars are condensed, and then into an accumulator 124 where a further separation of gas and liquid takes place. This final cooling step reduces the temperature of the gases to about 100° F. The gases are released from the accumulator through conduit 126 and pass into a Cottrell precipitator 128. Liquid is removed from the precipitator through conduit 132, is combined with accumulator liquid from pump 130 and conduit 134, the combined stream is added to the tar product passing through conduit 138. The final vapor product comprising primarily combustion gases and steam leaves the precipitator and the unit through conduit 130.

The preceding discussion has been directed to a preferred embodiment of the invention as specifically illustrated in Figure 1. It is not intended that the material presented be constructed in any limiting sense, but that other equipment, process conditions flows, etc. are also used within the scope of the invention. For example, to limit the possibility of equipment plugging prior to the drying operation it may be desirable to introduce wet coal directly from a mechanical conveyor, such as a bucket elevator, into the dryer vessel 10. Again, to provide a more flexible process, drying and preheating facilities may be provided. Other arrangements of the pretreating and carbonization zones are also contemplated, for example the two operations may be carried out in entirely separate zones. As an alternate to the arrangement shown in Figure 1, it is within the scope of the invention to carry the top level of the dense solids in the drying zone 12 at or below the top of the preheating zone 14. In addition, rather than overflowing solids from the preheating to the drying zone, it may be desirable to provide an opening in the preheating zone so as to pass solids directly from one dense phase to the other immaterial of the specific arrangement of the preheating zone relative to the drying zone.

The following data are presented to illustrated a typical commercial carbonization operation based on the processing arrangement of Figure 1.

Example

| Flows: | Lb./hr. |
|---|---|
| Wet coal—10 to 400 mesh | 450,000 |
| Water content | 35,000 |
| Dry coal | 415,000 |
| Char product | 345,000 |
| Volatile product | 60,000 |
| Solids content | 1,000 |
| Pretreater air | 80,000 |
| Carbonizer air | 50,000 |
| Char recycle (for pretreater temperature control) | 25,000 |
| Feed coal heater: | |
|   Coal circulation rate | 1,250,000 |
|   Heating fluid—15° API hydrocarbon oil | 1,550,000 |
| Product char cooler: | |
|   Cooling fluid—15° API hydrocarbon oil | 1,550,000 |
| Cooling water injected into char product | 28,000 |
| Water to solids recovery tower | 96,000 |
| Tar quench tower reflux | 580,000 |

| Temperatures: | °F. |
|---|---|
| Wet coal | 60 |
| Drying zone | 270 |
| Preheating zone | 480 |
| Pretreating zone | 725 |
| Carbonization zone | 950 |
| Char hopper | 230 |
| Solids recovery tower | 216 |
| Tar quench overhead | 165 |
| Feed coal heater: | |
|   Coal in | 270 |
|   Coal out | 480 |
|   Heating fluid in | 500 |
|   Heating fluid out | 400 |
| Product char cooler: | |
|   Char in | 950 |
|   Char out | 500 |
|   Cooling fluid in | 400 |
|   Cooling fluid out | 470 |
| Cottrell precipitator | 150 |
| Product char | 190 |
| Tar product | 350 |

| Pressures: | P. s. i. g. |
|---|---|
| Drying zone | 3.8 |
| Preheating zone | 6.0 |
| Pretreating zone (top) | 11.0 |
| Carbonization zone (disperse phase) | 8.0 |
| Char hopper | 3.5 |
| Solids recovery tower | 2.0 |
| Tar quench tower | 6.0 |

| Average residence time of coal in: | Minutes |
|---|---|
| Pretreating zone | 60 |
| Carbonization zone | 30 |

| Gas velocity in: | Ft./sec. |
|---|---|
| Drying zone | 2.0 |
| Preheating zone | 2.5 |
| Pretreating zone | 1.0 |
| Carbonization zone | 1.5 |

| Density of solids in: | Lbs./cu. ft. |
|---|---|
| Drying zone | 25 |
| Preheating zone | 25 |
| Pretreating zone | 22 |
| Carbonization zone | 18 |

A process for supplying the necessary preheat, in conjunction with drying of the wet coal feed, as illustrated in Figure 1, has been described in detail. This method of preparing the coal for pretreatment, although it possesses many advantages, is relatively inflexible in operation. For reasons of heat transfer efficiency, the temperature in the drying zone is preferably maintained at the minimum necessary to drive off surface water introduced with the wet coal. Similarly the preheater temperature, once established, is more or less fixed and cannot be varied without seriously affecting the subsequent pretreating and carbonization steps. In an operating unit the range of variation of these temperatures serves to limit the amount of coal solids circulated through the coal heater. This is important since the heat transfer coefficient of the gas-solids stream passing through the heater is directly proportional to the quantity of solids in said stream, and, therefore, it may be desirable to vary the composition of this stream.

A more flexible drying and preheating process arrangement wherein the advantages of a variable composition gas-solids stream are realized is possible if the two steps are made somewhat less interdependent. In one embodiment of such an arrangement, the dry and preheated solids are again maintained in dense phase fluidized beds similar to those illustrated in Figure 1; however, in this instance the beds are entirely separated and solids do not flow from the preheating zone into the drying zone. In carrying out the drying operation, wet coal is introduced into the drying zone solids bed wherein it is quickly elevated in temperature with a concurrent release of surface water as steam. A stream of dry coal is passed from this bed through a first indirect tubular heater and is then returned to the drying zone to supply the heat required therein. The range of temperature through which drying may be effected is substantially the same as for the drying process previously discussed. It is necessary to provide sufficient residence time in the drier for the coal to become heated to the drying temperature and for the water vapors released therein to escape from the solids bed; more usually a residence time of between about 1 and about 15 minutes is sufficient. The amount of solids circulated through the heater varies with the moisture content of the coal and the temperature maintained in the drying zone; more usually, the solids circulation rate is maintained between about 2 and about 15 pounds of solids per pound of wet coal feed. With circulation rates of this order of magnitude, it is necessary in order to provide the heat required for drying to increase the temperature of the coal during passage through the heater to between about 250 and about 500° F. Heat is transmitted to the dry coal solids from a hot fluid stream, preferably selected from the group of fluids previously listed. This material is admitted to the heater in sufficient quantity and at an adequate temperature to provide the necessary transfer of heat. As stated before, it is usually preferred to introduce this fluid into the heater at a temperature between about 350° F. and 1000° F.

In addition to the solids circulated through the drying zone a further amount of solids is passed from this zone through the first heater, then through a second heater and into the preheating zone. In the latter heater, additional thermal energy is transferred to the coal to provide the necessary degree of preheat needed for the pretreating operation. Since the preheated coal is the only source of feed to the pretreating zone, the second solids stream must contain at least an amount of coal equivalent to the wet coal feed on a dry basis. This quantity of solids, however, is not sufficient to provide the solids density in the second heater necessary for good heat transfer. To remedy this, an additional stream of solids is recycled from the preheater to the inlet of the second heater. More usually it is preferred to circulate coal solids through the preheating zone at a rate between about 2 and about 10 pounds per pound of wet coal feed. The variables and operating conditions contemplated for use in this portion of the process, in general, conform in magnitude to those previously given in the general discussion of coal preheating. For example, the temperature in the preheating zone is usually maintained between about 350 and about 650° F. A similar heating fluid is used to supply heat to the solids in the second heater and the quantity and temperature of this material is suitably adjusted to give the desired results.

The aforedescribed method of drying and preheating provides a number of advantages over the method illustrated in Figure 1. For example, it provides a more flexible process in which coal circulation rates through the heaters and the temperatures in the drying and preheating zones can be varied more or less independently of each other. This increased flexibility of operation is particularly important from the viewpoint of obtaining maximum heat transfer rates in the heaters and reducing the heating surfaces to a minimum. As previously mentioned, the heat transfer coefficient is directly proportional to the density of solids in the gases passing through the tubular heater. That is, when the concentration of solids in the gas is increased the heat transfer coefficient increases, and when the solids density decreases the heat transfer coefficient is lowered. The density of the gas-solids mixture in turn is determined by two factors, the velocity of the fluidizing gases and the solids circulation rate. When the solids circulation rate is relatively fixed, as in the drying and preheating method of Figure 1, the only way in which solids density can be changed is by varying the velocity of the fluidizing gas. Thus, if it is desired to increase solids density, the velocity of the fluidizing gas must be decreased, and conversely a decrease in solids density is brought about by increasing the velocity of the fluidizing medium. Unfortunately, this variable can only be manipulated within certain limits. For example, at a velocity below about 0.25 foot per second solids do not remain in suspension and at high velocities erosion of the heat exchange equipment may become a problem. With the system of preheating and drying just described, it is possible to vary both the solids circulation rate and the fluidizing gas velocity thereby providing a more flexible operation.

Another important advantage of this method of operating lies in the fact that the drying and preheating steps are carried out in entirely separate heaters rather than in one heater. The efficiency of heat transfer in an exchanger is a function not only of heat transfer coefficients but also of temperature difference between the heat source and the heat absorbing stream. The greater the average difference between these temperatures, the more efficiently is the heat exchanged. The use of a separate heater for drying the coal provides a substantially higher temperature differential in this heater than exists in the heater of Figure 1. Since the major portion of the heat required in the two heating steps, usually between about 55 and about 75 percent, is transferred in the first heater, a more thermally efficient process results from this method of operation. This is true even though the temperature difference in the preheat exchanger is less favorable than the temperature difference in the heater of Figure 1. The thermal advantage of the two-heater system is further enhanced by passing a substantial part of the solids to be preheated through the first exchanger, wherein a portion of the required preheat is provided. The net result is a more efficient drying and preheating process which substantially decreases heat exchange equipment requirements. Still another important advantage results from the use of the two-exchanger system. It often happens in commercial installations that heat exchange equipment must be limited in physical dimensions, particularly in height. With the use of vertical type heaters as contemplated herein the restriction of exchanger length becomes an important problem. In a system where the rate of solids circulation, and thus the solids concentration or density, can be varied it is possible to obtain similar results to those which are produced in the apparatus of Figure 1 with an exchanger of lower surface area. This, of course, means a shorter exchanger which simplifies the supporting structure and allows a greater variety of equipment location.

Although in the aforedescribed operation there is no passage of solids from the preheating zone to the drying zone, as in the process illustrated by Figure 1, this method of treating the coal may be carried out in similar apparatus with only a slight modification, that is by extending the vessel which encloses the preheating zone above the level of the dense phase bed of solids in the drying zone. Thus this system also provides the advantages of carrying out both drying and preheating in a single vessel.

Figure 2:
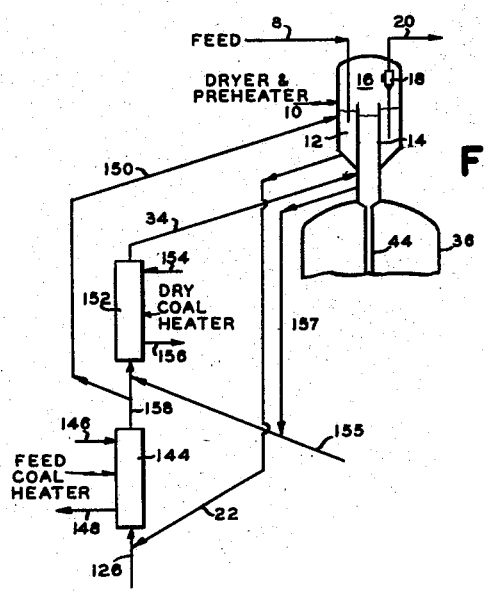
Figure 2 is a diagrammatic illustration in cross section of another embodiment of a coal drier, preheater, and associated heat exchange equipment.

In order to more clearly illustrate this aspect of the invention, reference is had to Figure 2. Referring to Figure 2, drying and preheating of the coal are carried out in a vertical cylindrical vessel 10 somewhat similar to that illustrated in Figure 1. Internally vessel 10 is divided into concentric zones 12 and 14 by a cylindrical member which terminates below the inside top of vessel 10 and extends downwardly outside and below vessel 10, being supported on the carbonizer vessel 36. The drying portion of the process is carried out in the annular space which forms zone 12 in a dense phase turbulent bed of dry coal particles, the upper level of which lies below the top terminus of the cylindrical member. Preheated coal is accumulated in zone 14 and is maintained therein in a similar dense phase bed, also having an upper level below the top of the cylindrical member whereby the two beds are kept entirely separate.

Vapors released within the two zones enter a common dilute phase 16 above the solids bed, pass through a conventional cyclone 18 for the removal of entrained solids, and exit from the system through conduit 20. Wet coal solids are introduced to the drier through conduit 8 and enter the dense turbulent bed 12 where they are quickly heated to the drying temperature, that is to about 270° F. At the pressure maintained on the system, namely about 4 p. s. i. g., this is considerably above the boiling point of water. As a result, the water introduced with the coal is quickly converted to steam which escapes to the dilute phase 16 and from the drying and preheating system as previously described. To provide the large amount of heat required for this operation, a stream of solids is removed from the dense phase bed 12, passed downwardly through conduit 22, entrained in steam and passed upwardly through conduit 126 and feed coal heater 144. An amount of heated solids equal in quantity to the wet coal feed rate, that is about 10 percent of the total solids passed through the heater, is further passed through the dry coal heater 152 and returned to the preheating zone 14. The remainder of the dry heated coal is passed through conduit 150 to the drying zone 12. The total quantity of coal circulated through the feed coal heater 144 is about 10 pounds per pound of wet coal feed and in its passage through this heater the coal is elevated in temperature from about 270° F. to about 325° F. Passage of the aforementioned solids stream through heater 152 does not provide a sufficient concentration of solids in the heat to assure good heat transfer. To increase the solids density in this stream to a more desirable level, a second stream of solids is circulated from the preheating zone 14 also through heater 152, and is returned to zone 14. The circulated solids are removed from the aforesaid zone through conduit 157, entrained in fluidizing steam introduced through conduit 155 and the mixture is combined with solids leaving the feed coal heater 144 through conduit 158. The total solids then pass through the heater 152 and return to the preheating zone through conduit 34. To maintain the preheater temperature at about 480° F., it is necessary to provide a rate of solids withdrawal from bed 14 for circulation through heater 152 of about 5 pounds per pound of wet coal feed. This quantity of solids combined with the solids from the feed coal heater 144 produces a temperature of about 450° F. entering heater 152. In its passage through the latter heater the coal is further elevated in temperature to about 480° F.

The heat required to carry out the drying and preheating step is supplied by using a hot hydrocarbon oil similar to that mentioned in the discussion of Figure 1. A separate stream of oil may be used in each of the two heaters; however, it is preferred to use a common heating fluid for both services with the oil being passed through the heater countercurrent to the fluidized coal, the sequence of passage through the heaters being opposite to the coal stream circulated from the drying zone. The flow of oil through the heaters is maintained at a sufficient rate to provide an inlet temperature to the dry coal heater 152 of about 675° F. At the coal circulation rates illustrated, the oil leaves the dry coal heater at about 580° F. and the feed coal heater 144 at about 400° F.

As previously described in the discussion of Figure 1, preheated coal passes from zone 14 downwardly through standpipe 44 into a pretreating zone 42 contained within the carbonization zone 36. Fluidization of the solids within zone 14 is maintained by introducing a small amount of steam through conduit 13. The remainder of the coal carbonization process and product recovery system conforms to the illustration of Figure 1 as described in the preceding discussion.

A typical application of this embodiment of the invention on a commercial scale is illustrated by the following data.

*Example*

Flows: Lb./hr.
   Wet coal—10 to 400 mesh_____ 450,000
      Water content_____ 35,000
   Dry coal_____ 415,000
   Feed coal heater:
      Coal circulation rate_____ 4,500,000
      Heating fluid—15° API hydrocarbon oil _____ 1,550,000
   Dry coal heater:
      Coal circulation rate_____ 2,250,000
      Heating fluid—15° API hydrocarbon oil_____ 1,550,000

Temperatures: ° F.
   Wet coal_____ 60
   Drying zone_____ 270
   Preheating zone_____ 480
   Feed coal heater:
      Coal in_____ 270
      Coal out_____ 325
      Heating fluid in_____ 465
      Heating fluid out_____ 400
   Dry coal heater:
      Coal in_____ 450
      Coal out_____ 480
      Heating fluid in_____ 500
      Heating fluid out_____ 465

Gas velocity in: Ft./sec.
   Drying zone_____ 2.0
   Preheating zone_____ 2.5

Density of solids in: Lb./cu. ft.
   Drying zone_____ 25
   Preheating zone_____ 25

The preceding illustration, Figures 1 and 2 exemplify preferred embodiments of the invention; however, it is not intended that they be construed in a limiting sense. Thus other processing schemes and variations and modifications are also within the scope of this invention. For example, in the system of Figure 2, part of the heat required for drying may be obtained by passing solids from the preheating zone 14 to the drying zone 12 as in the process of Figure 1. Also downflow tubular exchangers may be used rather than the upflow type; however, the former, being much more efficient, are preferred. In certain of its aspects this invention is much broader in its scope than in other aspects. For example, the pretreating and carbonization phases of the process are limited to the treatment in a more or less specific manner, of carbonaceous solids. This is not true, however, of the drying and preheating steps, nor is it true of the use of a common heat exchange fluid. Because of its broader applicability, it is contemplated that the processing methods relating to this operation may be used in other processes and in the treatment of solids other than carbonaceous solids, such as, for example catalytic materials and solids normally used for contacting purposes, such as pumice, carborundum, sand, etc. The presence of volatile surface liquids other than water may also affect the fluidizing properties of finely subdivided solids and removal of such liquids is also contemplated by the appropriate use of these operating procedures. The temperature ranges given for drying and preheating are primarily applicable to a low pressure carbonization system and might not be appropriate in a process operating under either reduced pressures or elevated pressures, or where a different use of the preheated solids is contemplated. It is, therefore, intended that the invention include within its scope operating conditions suitable to the particular process in which drying and preheating are required. Although uses of these methods, other than in the treatment of carbonaceous solids by carbonization, such as for example in coal gasification, preparation of powdered solid fuels, catalytic cracking processes, etc. are contemplated it should be understood that equivalent results are not to be expected in all uses and the preferred embodiments are those illustrated and described herein.

Having thus described the invention by reference to a specific example thereof, it is understood that no undue limitations or restrictions are to be imposed by reason thereof, but that the scope of the invention is defined by the appended claims.

I claim:

1. A process for drying finely divided solids wet with a liquid material which comprises maintaining a dense phase bed of wet solids under fluidizing conditions superposed by a dilute phase of said solids in a drying zone at a temperature above the boiling point of the liquid wetting material, maintaining a second dense phase bed of said solids under fluidizing conditions at a higher temperature in a second zone disposed in open communication with said drying zone for entrance of vapors from each of said zones into said dilute solids phase in said drying zone, introducing wet solids to said drying zone, retaining said solids in said drying zone to effect a desired drying thereof, passing solids from said second zone to said drying zone to supply the heat required for said desired drying, removing dried solids from said drying zone, passing said removed solids in indirect heat exchange with a heated fluid, introducing the heated removed solids into said second zone to provide the higher temperature maintained therein, yielding released vapor from said dilute solids phase in said drying zone, and yielding solids from the second zone.

2. The process of claim 1 in which the finely divided solids are carbonaceous solids and the wetting material is water.

3. The process of claim 1 in which the solids removed from the drying zone are passed through a plurality of confined zones in indirect heat exchange with a heated fluid.

4. A process for drying finely divided coal which comprises maintaining a dense phase bed of coal solids superposed by a dilute solids phase under fluidizing conditions in a drying zone at a temperature above the boiling point of water, maintaining a second dense phase bed of said solids under fluidizing conditions at a higher temperature in a second zone contiguous to the drying zone and in open communication therewith below the level of the dense phase in said drying zone, passing vapors released in said second dense phase bed through the coal solids in said first dense phase bed and into the dilute solids phase above said first dense phase bed, introducing coal solids wet with water to said drying zone, retaining said introduced solids in said drying zone to effect a desired drying thereof, passing solids from said second zone to said drying zone in quantity to supply the heat required for the drying operation, removing dry coal solids from said drying zone, passing said dry coal solids through a plurality of confined zones in indirect heat exchange with a heated fluid, introducing the thereby heated dry coal solids into said second zone to provide the higher temperature maintained therein, yielding released vapors from said dilute solids phase in said drying zone, and yielding solids from the second zone.

5. A process for drying finely divided coal which comprises maintaining a dense phase bed of coal solids superposed by a dilute solids phase under fluidizing conditions in a drying zone at a temperature above the boiling point of water, maintaining a second dense phase bed of said solids under fluidizing conditions at a higher temperature in a second zone disposed in open communication and contiguous to said drying zone whereby said dilute solids phase is common to both said dense phase beds, introducing coal solids wet with water to said drying zone, retaining said introduced solids in said drying zone to effect a desired drying thereof, passing solids from said second zone to said drying zone to supply the heat required for the drying operation, removing dry coal solids from said drying zone, passing said dry coal solids through a plurality of confined zones in indirect heat exchange with a heated fluid, introducing the thereby heated dry coal solids into said second zone to provide the higher temperature maintained therein, yielding released vapors from said dilute solids phase, and yielding solids from the second zone.

6. A process for drying wet, finely divided solids which comprises maintaining a dense phase bed of said solids superposed by a dilute solids phase under fluidizing conditions, in a drying zone at a temperature above the boiling point of the wetting material, maintaining a second dense phase bed of said solids under fluidizing conditions at a higher temperature in a second zone disposed in open communication and contiguous with said drying zone whereby vapors from the two zones enter the dilute solids phase, introducing wet solids to said drying zone, retaining said solids in said drying zone to effect a desired drying thereof, removing dry solids from said drying zone, passing said solids in indirect heat exchange with a heated fluid, returning a portion of the thereby heated solids to said drying zone to supply the heat required for the drying operation, removing solids from said second zone, combining the remainder of the heated solids with the solids from the second zone, passing the combined solids in indirect heat exchange with a heated fluid, introducing the thereby heated combined solids to said second zone to provide the higher temperature maintained therein, yielding released vapors from said dilute solids phase, and yielding solids from the second zone.

7. The process of claim 6 in which a part of the heat required for drying is supplied by passing solids from the second zone to the drying zone.

8. The process of claim 6 in which the finely divided solids are carbonaceous solids and the wetting material is water.

References Cited in the file of this patent
UNITED STATES PATENTS

| | | |
|---|---|---|
| 2,493,911 | Brandt | Jan. 10, 1950 |
| 2,511,652 | Shand | June 13, 1950 |
| 2,715,282 | Niven | Aug. 16, 1955 |
| 2,775,551 | Nathan et al. | Dec. 25, 1956 |